United States Patent [19]
Yamaoka et al.

[11] 3,869,398
[45] Mar. 4, 1975

[54] DIELECTRIC PORCELAIN COMPOSITION

[75] Inventors: Nobutatu Yamaoka, Takasaki; Yasunori Takahashi, Tokyo, both of Japan

[73] Assignees: Taiyo Yuden Kabushiki Kaish; Sony Corporation, both of Tokyo, Japan

[22] Filed: Aug. 23, 1973

[21] Appl. No.: 390,948

[30] Foreign Application Priority Data
Sept. 20, 1972  Japan.............................. 47-93697

[52] U.S. Cl................ 252/63.5, 252/62.9, 106/46, 106/73.3
[51] Int. Cl. ............................................. H01b 3/02
[58] Field of Search ......... 252/63.5, 62.9; 106/73.3, 106/46, 39.8

[56] References Cited
UNITED STATES PATENTS
2,369,327  2/1945  Wainer .......................... 106/DIG. 5

FOREIGN PATENTS OR APPLICATIONS
920,738  3/1963  Great Britain ..................... 252/63.5
246,677  6/1969  U.S.S.R............................. 252/63.5

OTHER PUBLICATIONS

Ekeda et al, "Piezoelectric Properties of Pb(Zr-Ti)O$_3$...," 2/64, pp. 63-71 Japanese Journal of Applied Physics, Vol. 3, 2 copy in 252/62.9

Primary Examiner—Maynard R. Wilbur
Assistant Examiner—N. Moskowitz
Attorney, Agent, or Firm—Waters, Roditi, Schwartz & Nissen

[57] ABSTRACT

A dielectric porcelain composition comprising a sintered product composed of above 2% by weight but below 31% by weight of lead titanate (PbTiO$_3$), above 35% by weight but below 83% by weight of strontium titanate (SrTiO$_3$), above 3% by weight but below 19.1% by weight of bismuth oxide (Bi$_2$O$_3$) above 0.5% by weight but below 18% by weight of titanium oxide (TiO$_2$) and above 2.8% by weight but below 20.1% by weight of calcium titanate (CaTiO$_3$), the weight ratio of titanium oxide (TiO$_2$) to bismuth oxide (Bi$_2$O$_3$) being between 0.2 and 2.0.

1 Claim, 3 Drawing Figures

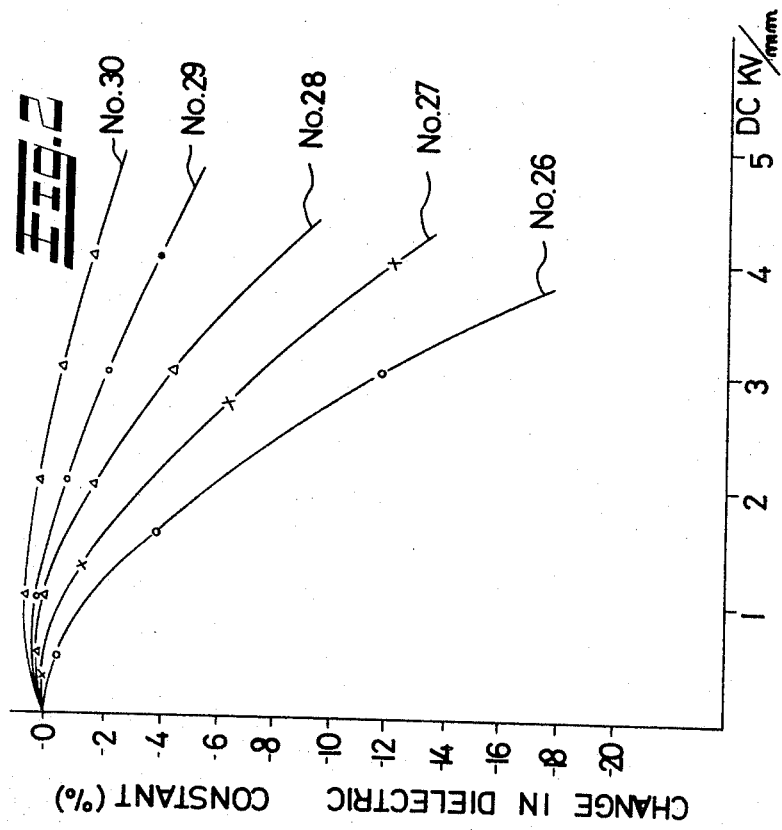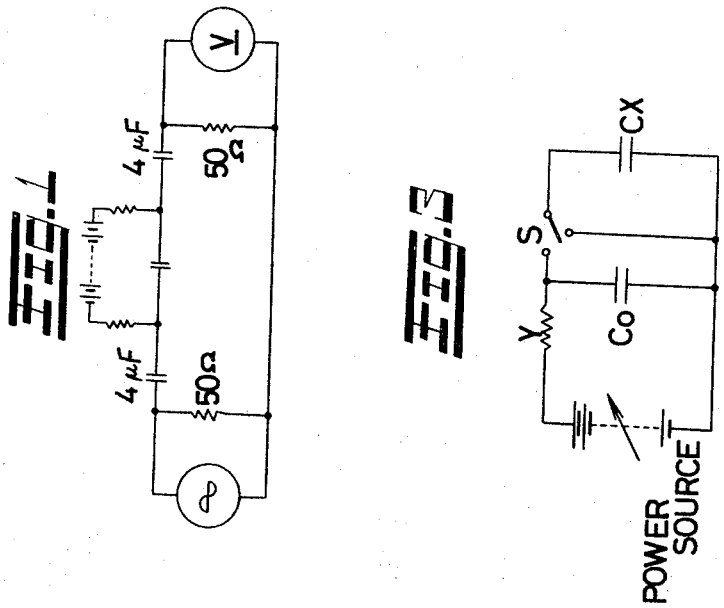

DIELECTRIC PORCELAIN COMPOSITION

BACKGROUND a. Field of the Invention

This invention relates to a dielectric porcelain composition which is comparatively high in dielectric constant, small in electric distortion property and small in voltage dependence of the dielectric constant.

b. Prior Art

A high dielectric constant porcelain having a dielectric constant of at least 1000 of barium titante type has been hitherto widely put into practical use. However, it has been found that barium titanate type porcelains exhibit an electric distortion property when the applied voltage is high, even if it is not especially subjected to a polarization treatment. Hence, when a condenser made of this type of material is used in a high voltage circuit, the electric distortion phenomenon causes a rapid voltage break-down, or resonance sound, or a piezo-electric type shock noise owing to mechanical impulse. Additionally, it is known that the barium titanate type porcelain causes a large decrease in electrostatic capacity for load voltage, but no improvements thereof have been made.

In order to obviate dificiencies associated with barium titanate ceramic dielectrics, the present invention have previously proposed a porcelain dielectric composition of $PbTiO_3$, $SrTiO_3$, $Bi_2O_3$, and $TiO_2$.

SUMMARY OF THE INVENTION

The invention is directed specifically to a high voltage and high capacity porcelain condenser, characterized in that it comprises a sintered product compound of above 2% by weight but below 31% by weight of lead titanate ($PbTiO_3$), above 35% by weight but below 83% by weight of strontium titante ($SrTiO_3$), above 3% by weight but below 19.1% by weight of bismuth oxide ($Bi_2O_3$) above 0.5% by weight but below 18% by weight of titanium oxide ($TiO_2$) and above 2.8% by weight but below 20.1% by weight of calcium titanate ($CaTiO_3$), the weight ratio of titanium oxide ($TiO_2$) to bismuth oxide ($Bi_2O_3$) being between 0.2 and 2.0.

BRIEF DESCRIPTION OF THE DRAWING

FIG. 1 is a circuit diagram showing a circuit for measuring electrical and mechanical coupling coefficients, FIG. 2 is a graph showing the voltage dependence property of the dielectric constant of various compositions, and FIG. 3 is a circuit diagram showing a circuit for a charging and discharging test cycle.

DESCRIPTION OF THE PREFERRED EMBODIMENTS

Samples of various blending compositions by weight as shown in Table 1 were respectively prepared in accordance with conventional ceramic manufacturing processes. Each composition was prepared by mixing and grinding the mixture and then it was molded under pressure and sintered in a furnace with an air atmosphere at a temperature of 1200°–1300°C to obtain a sample 4 mm in thickness and 20 mm in diameter. Then, for each of these samples, there were measured the dielectric constant, tan $\delta$, the electrical and mechanical coupling coefficient Kp, the break-down voltage and the bias property. The electrical and mechanical coupling coefficient is a value which is measured under the condition that a polarization treatment by a known process is not applied to the sample before measuring and a bias voltage of direct current of 3 Kv/mm is applied thereto at the time of measuring. FIG. 1 shows a circuit for measuring this properly, and in this circuit a resonant frequency ($f_0$) and an anti-resonant frequency ($f_1$) are measured from a voltage value of a valve voltmeter (V) by an oscillation frequency, and Kp is calculated from the following formula:

$$Kp = \sqrt{K(f_1 - F_0)f_0}$$

where, K is a constant depending on the vibration mode. The bias property is calculated from the following formula:

$$C_1 - C_0/C_0 \times 100 \, (\%)$$

where, $C_1$ is the electrostatic capacity at the time of application of a bias voltage of direct current of 3 Kv/mm, and $C_0$ is the electrostatic capacity at the time of zero bias.

Table 1

| | Sample No. | Composition (weight %) | | | | | |
|---|---|---|---|---|---|---|---|
| | | $SrTiO_3$ | $PbTiO_3$ | $CaTiO_3$ | $Bi_2O_3$ | $TiO_2$ | $TiO_2 / Bi_2O_3$ |
| X | 1 | 83 | 6 | 5 | 5 | 1 | 0.2 |
|   | 2 | 80 | 8 | 6 | 5 | 1 | 0.2 |
| X | 3 | 71 | 2 | 5 | 7.8 | 14.2 | 1.8 |
|   | 4 | 62.4 | 5 | 5 | 18.5 | 9.1 | 0.49 |
| X | 5 | 60.0 | 16.1 | 0 | 16.1 | 7.8 | 0.48 |
| X | 6 | 58.2 | 15.6 | 2.8 | 15.6 | 7.8 | 0.5 |
|   | 7 | 57.2 | 15.3 | 4.6 | 15.3 | 7.6 | 0.5 |
|   | 8 | 55.7 | 14.9 | 7.1 | 14.9 | 7.4 | 0.5 |
|   | 9 | 54.6 | 14.7 | 8.8 | 14.7 | 7.2 | 0.49 |
|   | 10 | 53.7 | 14.4 | 10.3 | 14.4 | 7.2 | 0.50 |
|   | 11 | 52.7 | 14.2 | 11.9 | 14.2 | 7.0 | 0.49 |
| X | 12 | 45.0 | 23.0 | 7.1 | 19.1 | 5.8 | 0.30 |
|   | 13 | 43.6 | 24.4 | 9.1 | 17.3 | 5.6 | 0.32 |
|   | 14 | 38.2 | 26.4 | 12.1 | 17.3 | 6.0 | 0.34 |
|   | 15 | 42.0 | 23.6 | 13.5 | 15.5 | 5.4 | 0.35 |
|   | 16 | 39.6 | 22.1 | 19.1 | 14.0 | 5.1 | 0.36 |
| X | 17 | 40.0 | 22.0 | 20.1 | 12.8 | 5.1 | 0.40 |
| X | 18 | 36.4 | 31.0 | 9.0 | 17.3 | 5.6 | 0.32 |
| X | 19 | 79.0 | 12.0 | 5.0 | 3.0 | 1.0 | 0.33 |
|   | 20 | 53.6 | 13.6 | 7.3 | 12.7 | 12.8 | 1.0 |
| X | 21 | 50.0 | 12.6 | 6.0 | 13.4 | 18.0 | 1.3 |
| X | 22 | 35.0 | 20.0 | 19.0 | 16.0 | 10.0 | 0.62 |
| X | 23 | 76.0 | 10.0 | 7.5 | 6.0 | 0.5 | 0.08 |
|   | 24 | 55.0 | 18.0 | 3.0 | 8.0 | 16.0 | 2.0 |
| X | 25 | 58.0 | 17.0 | 3.0 | 6.0 | 16.0 | 2.7 |

Properties

| | Sample No. | Dielectric constant | Tan δ (%) | Kp (%) | Breakdown voltage (Kv/mm) | Bias (%) |
|---|---|---|---|---|---|---|
| X | 1 | 900 | 0.05 | 3.0 | 15 | −9 |
|   | 2 | 1070 | 0.05 | 2.9 | 15 | −7.5 |
| X | 3 | 750 | 0.05 | 2.5 | 14 | −5.5 |
|   | 4 | 1100 | 0.05 | 2.4 | 18 | −3.1 |
| X | 5 | 2200 | 0.05 | 6.6 | 12 | −20.0 |
| X | 6 | 2000 | 0.05 | 5.8 | 14 | −15.0 |
|   | 7 | 1900 | 0.05 | 4.4 | 16 | −9.0 |
|   | 8 | 1800 | 0.1 | 3.5 | 16 | −5.0 |
|   | 9 | 1650 | 0.1 | 4.8 | 18 | −2.5 |
|   | 10 | 1400 | 0.1 | 2.9 | 18 | −0.5 |
|   | 11 | 1300 | 0.1 | 2.0 | 18 | +0.5 |
| X | 12 | 2000 | 4.5 | 10.1 | 11 | −15.7 |
|   | 13 | 1750 | 2.0 | 3.8 | 13 | −5.7 |
|   | 14 | 1350 | 0.6 | 3.5 | 13 | −0.95 |
|   | 15 | 1150 | 0.6 | 3.0 | 14 | +2.83 |
|   | 16 | 1050 | 0.3 | 2.9 | 18 | +3.50 |
| X | 17 | 850 | 0.3 | 2.5 | 18 | +4.0 |
| X | 18 | 2500 | 8.4 | 15.0 | 8 | sintering insufficient |
| X | 19 | 900 | 0.1 | 3.1 | 14 | −8.1 |
|   | 20 | 1200 | 0.1 | 3.0 | 14 | −8.5 |
| X | 21 | 950 | 0.1 | 3.5 | 14 | −10.5 |
| X | 22 | 870 | 0.3 | 5.0 | 13 | −3.5 |
| X | 23 | 750 | 0.5 | 2.8 | 13 | −8.2 |
|   | 24 | 1080 | 0.1 | 3.0 | 15 | −4.5 |
| X | 25 | 820 | 0.05 | 2.4 | 15 | −5.0 |

Referring to Table 1, if $SrTiO_3$ is 83% or more and 35% or less as in samples Nos. 1 and 22, the dielectric constant is below 1000 which renders the condensor inadequate. If $PbTiO_3$ is 2% or less as in sample No. 3, the dielectric constant is similarly lowered, and if it is 31% or more as in sample No. 18, the dielectric constant is high but tan δ and the electrical and mechanical coupling coefficient Kp are excessively large and additionally the breakdown voltage is also lowered and the sintering property is insufficient. If $CaTiO_3$ is 2.8% or less as in samples 5 and 6, the bias property is not improved, and if it is 20.1% or more as in sample No. 17, the dielectric constant is lowered. If $Bi_2O_3$ is 3% or less as in sample No. 19, the dielectric constant is lowered, and if it is 19.1% or more as in sample No. 12, tan δ is large and also the bias property is not improved. If $TiO_2$ is 0.5% or less as in sample No. 23 or is 18.0% or more as in sample No. 21, the dielectric constant is lower than 1000 and hence unacceptable. Additionally, if the ratio of $TiO_2$ to $Bi_2O_3$ is above 2.0 as in sample No. 25, the dielectric constant becomes lower than 1000. If this ratio is below 0.2, sintering is difficult and a fine porcelain cannot be obtained.

The dielectric porcelain composition of the invention is characterized in that lead titanate, strontium titanate, bismuth oxide, titanium oxide and calcium titanate are composed within the foregoing respective ranges, and thereby it is possible to obtain such a product whose dielectric constant is 1000 or more, Kp is 10% or less, the breakdown voltage is 13 Kv/mm or more and the bias property is from −10% to +3%.

It can be assumed that the improvement in the electrical and mechanical coupling cofficient Kp and the bias property is chiefly due to the action of $CaTiO_3$, though the mechanism thereof is not yet understood. As shown in Table 2, compositions of $SrTiO_3$; $PbTiO_3$; $Bi_2O_3$; $TiO_2$ mixed in predetermined constant amounts are respectively mixed with different amounts of $CaTiO_3$ so as to form the indicated respective samples of 100% by weight and the influence of the added $CaTiO_3$ is measured.

Table 2

| Sample No. | Composition (weight %) | | | | | Dielectric constant | Properties | | Bias (%) |
| | $SiTiO_3$ (60%) | $PbTiO_3$ (22%) | $Bi_2O_3$ (13.5%) | $TiO_2$ (4.5%) | $CaTiO_3$ | | tan δ (%) | Kp (%) | |
|---|---|---|---|---|---|---|---|---|---|
| 26 | | 100 | | | 0 | 2500 | 0.10 | 7.5 | −11.8 |
| 27 | | 97 | | | 3 | 2200 | 0.05 | 6.0 | −7.5 |
| 28 | | 95 | | | 5 | 2000 | 0.05 | 5.8 | −4.0 |
| 29 | | 90 | | | 10 | 1800 | 0.5 | 4.7 | −2.0 |
| 30 | | 87 | | | 13 | 1500 | 0.5 | 3.0 | −0.4 |

From Table 2, it will be clear that by the addition of $CaTiO_3$ the dielectric constant has a somewhat lowering tendency but the Kp is remarkably improved. Additionally, with respect to the sample in Table 2, the voltage dependence property of the dielectric constant change is measured to obtain the curves as shown in FIG. 2. Namely, it is shown therein that the voltage dependence property of the dielectric constant is extremely improved with increase in the amount of $CaTiO_3$ which is added. As shown in Table 1, the porcelain composition of the invention is excellent in values of breakdown voltage, and it is superior to the known material also in the charging and discharging test. Namely, in the case when, for example, in a circuit as shown in FIG. 3 a test product is supplied with a rated direct current voltage (3 Kv/mm in the case) and charging and discharging are repeated, the product of the invention, i.e. sample No. 11 does not break down even after 100,000 cycles. In FIG. 3, Cx designates the condenser to be tested, Co is an electric charge supplying condenser, Y is a circuit protecting resistor and S is a switch.

Thus, a condenser with the dielectric porcelain composition of the invention exhibits characteristic features especially in a high voltage circuit, and when compared with the conventional high dielectric constant porcelain of barium titanate type, is high in initial stage breakdown voltage and at the same time is small in the electric distortion property. Hence, the troubles caused by the known porcelain in a high voltage circuit are diminished and its deterioration during its use is extremely reduced as shown in the charging and discharging test. Accordingly, an elememt which is smaller in thickness than that of the conventional material can withstand the predetermined use voltage, and therefore the electrostatic capacity per unit of electrode area becomes large in reverse proportion thereto, and since the voltage dependence property of the dielectric constant is extremely small, it is not necessary that a high initial electrostatic capacity value be used in expectation of capacity decrease. Thus, by the mutual cooperation of these effects, a result is obtained in which the volume of a ceramic body can be reduced to from 1/10 to 1/15 in comparison with that of the barium titanate type porcelain for the same use.

What is claimed is:

1. A dielectric porcelain composition comprising a sintered product consisting essentially of above 2% by weight but below 31% by weight of lead titanate ($PbTiO_3$), above 35% by weight but below 83% by weight of strontium titante ($SrTiO_3$), above 3% by weight but below 19.1% by weight of bismuth oxide ($Bi_2O_3$), above 0.5% by weight but below 18% by weight of titanium oxide ($TiO_2$) and above 2.8% by weight but below 20.1% by weight of calcium titanate ($CaTiO_3$), the weight ratio of titanium oxide ($TiO_2$) to bismuth oxide ($Bi_2O_3$) being between 0.2 and 2.0.

* * * * *